(12) United States Patent
Shen et al.

(10) Patent No.: US 12,397,771 B2
(45) Date of Patent: Aug. 26, 2025

(54) AUTOMATIC SHIFT CONTROL METHOD, APPARATUS, DEVICE AND STORAGE MEDIUM

(71) Applicants: Zhejiang ZEEKR Intelligent Technology Co., Ltd., Zhejiang (CN); Viridi E-Mobility Technology (Ningbo) Co., Ltd., Zhejiang (CN); Zhejiang Geely Holding Group Co., LTD., Zhejiang (CN)

(72) Inventors: Keqing Shen, Zhejiang (CN); Dong Chen, Zhejiang (CN); Qiao Dong, Zhejiang (CN); Wenliang Liu, Zhejiang (CN); Yingguo Ma, Zhejiang (CN); Zouyun Shi, Zhejiang (CN); Qimiao Chen, Zhejiang (CN); Huian Sun, Zhejiang (CN); Bin Gu, Zhejiang (CN); Ou Ruan, Zhejiang (CN); Changluo Li, Zhejiang (CN)

(73) Assignees: Zhejiang ZEEKR Intelligent Technology Co., Ltd., Zhejiang (CN); Viridi E-Mobility Technology (Ningbo) Co., Ltd., Zhejiang (CN); Zhejiang Geely Holding Group Co., LTD., Zhejiang (CN)

(*) Notice: Subject to any disclaimer, the term of this patent is extended or adjusted under 35 U.S.C. 154(b) by 0 days.

(21) Appl. No.: 18/720,671

(22) PCT Filed: Dec. 8, 2022

(86) PCT No.: PCT/CN2022/137676
§ 371 (c)(1),
(2) Date: Jun. 17, 2024

(87) PCT Pub. No.: WO2024/119453
PCT Pub. Date: Jun. 13, 2024

(65) Prior Publication Data
US 2025/0100534 A1  Mar. 27, 2025

(51) Int. Cl.
*B60W 10/08* (2006.01)
*B60W 10/119* (2012.01)

(52) U.S. Cl.
CPC .......... *B60W 10/119* (2013.01); *B60W 10/08* (2013.01); *B60W 2510/083* (2013.01); *B60W 2710/021* (2013.01); *B60W 2710/081* (2013.01)

(58) Field of Classification Search
CPC .............. B60W 10/08; B60W 10/119; B60W 2510/083; B60W 2710/021; B60W 2710/081; F16D 48/06
See application file for complete search history.

(56) References Cited

U.S. PATENT DOCUMENTS

| 8,961,367 B2 * | 2/2015 | Suzuki | ................ B60W 10/06 477/109 |
| 2004/0038775 A1 * | 2/2004 | Shimizu | ............... B60W 10/02 477/6 |

(Continued)

FOREIGN PATENT DOCUMENTS

| CN | 102126430 | 7/2011 |
| CN | 104276031 | 1/2015 |

(Continued)

OTHER PUBLICATIONS

"International Search Report (Form PCT/ISA/210) of PCT/CN2022/137676," mailed on Aug. 16, 2023, with English translation thereof, pp. 1-5.

(Continued)

*Primary Examiner* — Edwin A Young
(74) *Attorney, Agent, or Firm* — JCIPRNET

(57) ABSTRACT

An automatic shift control method, apparatus, device and storage medium. A vehicle is controlled to perform an elastic release operation in response to a drive switching request. When unloading torque of a first electric machine of the (Continued)

vehicle is completed, a moving component of a disengaging and engaging apparatus of the vehicle is controlled to perform a position adaptive operation. Meshing direction and separation control is performed on the moving component when a rotational speed of the moving component reaches a stable state, to cause the moving component to move in a disengaging direction to a completely disengaged position, and switch of the vehicle from a four-wheel drive power mode to a two-wheel drive mode is completed.

20 Claims, 11 Drawing Sheets

(56) References Cited

U.S. PATENT DOCUMENTS

| | | | |
|---|---|---|---|
| 2011/0082004 | A1 | 4/2011 | Kato et al. |
| 2012/0253577 | A1 | 10/2012 | Schaeffer et al. |
| 2014/0066252 | A1 | 3/2014 | Suzuki et al. |
| 2022/0227348 | A1* | 7/2022 | Aratake ............... B60W 20/30 |

FOREIGN PATENT DOCUMENTS

| | | |
|---|---|---|
| CN | 105059284 | 9/2017 |
| CN | 107415774 | 12/2017 |
| CN | 107415774 B | 10/2019 |
| CN | 112503108 | 3/2021 |
| CN | 217328413 | 8/2022 |
| CN | 115158034 | 10/2022 |
| JP | 2006168392 | 6/2006 |
| JP | 2016210359 | 12/2016 |

OTHER PUBLICATIONS

"Written Opinion of the International Searching Authority (Form PCT/ISA/237) of PCT/CN2022/137676," mailed on Aug. 16, 2023, with English translation thereof, pp. 1-6.

"Search Report of Europe Counterpart Application", issued on Jan. 8, 2025, p. 1-p. 9.

"Office Action of Japan Counterpart Application", issued on May 28, 2025, with English translation thereof, p. 1-p. 10.

* cited by examiner

AUTOMATIC SHIFT CONTROL METHOD, APPARATUS, DEVICE AND STORAGE MEDIUM

CROSS-REFERENCE TO RELATED APPLICATION

The present application is a National Stage of International Application No. PCT/CN2022/137676 filed on Dec. 8, 2022, which is hereby incorporated by reference in its entirety.

TECHNICAL FIELD

The present application relates to the technical field of vehicles, and in particular, to an automatic shift control method, apparatus, device and storage medium.

BACKGROUND

In order to meet the dual indicators of power and economy of new energy vehicles, an automatic transmission with a function of disengaging and engaging is currently used to achieve power switching between two-wheel drive and four-wheel drive.

For example, when there is a power demand (such as large throttle) or four-wheel drive demand (such as rear wheel slip, unpaved road, etc.), a four-wheel drive mode will be used to improve the power, passability and safety of the vehicle, while when there is no power demand or four-wheel drive demand, a two-wheel drive mode will be used to reduce energy consumption of the power system. An electric machine or electromagnetic mechanism is usually used at the same time to realize the automatic control of the disengaging and engaging functions.

However, in the existing vehicles with a disengaging and engaging apparatus to achieve switching between two-wheel drive and four-wheel drive, impact and noise of a transmission system are generally present when the disengaging and engaging apparatus disengages to realize shifting and driving, for example, relative oscillation of rotational speed of an input shaft and an output shaft still exist when the gear is disengaged. As a result, when the disengaging and engaging apparatus is disengaged, meshing teeth of the disengaging and engaging apparatus will clash, resulting in impact, which will seriously affect driving experience.

SUMMARY

The present application provides an automatic shift control method, apparatus, device and storage medium to solve the technical problem that impact and noise in a transmission system occur due to clashes of meshing teeth of a disengaging and engaging apparatus during four-wheel drive to two-wheel drive power mode switching, thus affecting driving experience.

In a first aspect, the present application provides an automatic shift control method, including:
  controlling a vehicle to perform an elastic release operation in response to a drive switching request, where the drive switching request is used to instruct the vehicle to switch from a four-wheel drive power mode to a two-wheel drive power mode;
  controlling a moving component of a disengaging and engaging apparatus of the vehicle to perform a position adaptive operation when unloading of torque of a first electric machine of the vehicle is completed in the elastic release operation;
  when a rotational speed of the moving component reaches a stable state in the position adaptive operation, controlling a meshing direction of the moving component and performing separation control on the moving component, to cause the moving component to move in a disengaging direction to a completely disengaged position of the disengaging and engaging apparatus.

In a possible design, after the moving component moves in the disengaging direction to the completely disengaged position of the disengaging and engaging apparatus, there further includes:
  controlling the moving component to move from the completely disengaged position to a disengaged locking position in the disengaging direction.

In a possible design, after controlling the moving component to move from the completely disengaged position to the disengaged locking position, there further includes:
  controlling a rotor speed of the first electric machine of the vehicle to zero rotational speed to convert kinetic energy of the first electric machine into electric energy for storage or power supply.

In a possible design, the controlling the vehicle to perform the elastic release operation in response to the drive switching request includes:
  determining elastic unloading data according to first driving data of the vehicle in response to the drive switching request, where the elastic unloading data includes torque and elastic unloading duration, first control torque and torque of a second electric machine of the vehicle;
  controlling the vehicle to perform the elastic release operation according to the first control torque and the torque of the second electric machine within the torque and elastic unloading duration;
  where, in the elastic release operation, the unloading of the torque of the first electric machine is completed when the first control torque is zero.

In a possible design, the controlling the moving component of the disengaging and engaging apparatus of the vehicle to perform the position adaptive operation includes:
  determining adaptive control duration according to stiffness of a transmission system, and determining second control torque according to active damping torque of the first electric machine;
  controlling the moving component to perform the position adaptive operation according to the second control torque during the adaptive control duration;
  where, in a process of the position adaptive operation, the torque of the first electric machine is the second control torque and the torque of the second electric machine is driver demand torque; at the end of the position adaptive operation, the rotational speed of the moving component reaches the stable state.

In a possible design, the controlling the meshing direction of the moving component and performing separation control on the moving component includes:
  controlling the meshing direction of the moving component according to an arrival time of the stable state and a driving state of the vehicle, where the arrival time of the stable state is a starting time of movement of the moving component from a completely engaged position to the completely disengaged position of the disengaging and engaging apparatus;

after completing control of the meshing direction, performing separation control on the moving component according to an end time of control of the meshing direction and the driving state of the vehicle until the moving component moves in the disengaging direction to the completely disengaged position of the disengaging and engaging apparatus;

where the driving state includes an accelerating state, a decelerating state, and a non-accelerating and non-decelerating state.

In a possible design, the controlling the meshing direction of the moving component according to the arrival time of the stable state and the driving state of the vehicle includes:

determining control duration of the meshing direction according to the arrival time of the stable state, and determining third control torque according to the driving state of the vehicle;

controlling the meshing direction of the moving component according to the third control torque during the control duration of the meshing direction;

where, in a process of controlling the meshing direction, the torque of the first electric machine is the third control torque and the torque of the second electric machine is the driver demand torque.

In a possible design, the performing separation control on the moving component according to the end time of the control of the meshing direction and the driving state of the vehicle includes:

determining separation control duration according to the end time of the control of the meshing direction and the completely disengaged position;

determining fourth control torque according to the driving state of the vehicle;

performing separation control on the moving component according to the fourth control torque during the separation control duration;

where, in a process of performing the separation control on the moving component, the torque of the first electric machine is the fourth control torque and the torque of the second electric machine is the driver demand torque.

In a possible design, before the controlling the vehicle to perform the elastic release operation in response to the drive switching request, there further includes:

obtaining second driving data of the vehicle;

determining a current drive mode of the vehicle according to the second driving data; generating the drive switching request if the current drive mode is the four-wheel drive power mode and an execution request for the two-wheel drive power mode is received.

In a possible design, the vehicle includes an electric vehicle or a hybrid vehicle;

when the vehicle is the electric vehicle, the first electric machine and the second electric machine respectively include a generator;

when the vehicle is the hybrid automobile, the first electric machine includes a generator and the second electric machine includes an engine.

In a possible design, a construction mode of the disengaging and engaging apparatus includes any of a synchronizer type, dog tooth type, and clutch type;

when the construction mode is the synchronizer type or the dog tooth type, the moving component includes passive teeth and active teeth.

In a second aspect, the present application provides an automatic shift control apparatus including:

a first control module, configured to control a vehicle to perform an elastic release operation in response to a drive switching request, where the drive switching request is used to instruct the vehicle to switch from a four-wheel drive power mode to a two-wheel drive power mode;

a second control module, configured to control a moving component of a disengaging and engaging apparatus of the vehicle to perform a position adaptive operation when unloading of torque of a first electric machine of the vehicle is completed in the elastic release operation;

a third control module, configured to, when a rotational speed of the moving component reaches a stable state in the position adaptive operation, control a meshing direction of the moving component and perform separation control on the moving component, to cause the moving component to move in a disengaging direction to a completely disengaged position of the disengaging and engaging apparatus.

In a third aspect, the present application provides an electronic device including: a processor, and a memory communicatively connected with the processor;

the memory stores computer-executed instructions;

the processor executes the computer-executed instructions stored in the memory to implement any of possible automatic shift control methods provided in the first aspect.

In a fourth aspect, the present application provides a computer readable storage medium, the computer readable storage medium stores computer-executed instructions, and when the computer-executed instructions are executed by a processor, they are used to implement any of possible automatic shift control methods provided in the first aspect.

The present application provides an automatic shift control method, apparatus, device and storage medium. First, a vehicle is controlled to perform an elastic release operation in response to a drive switching request, where the drive switching request is used to instruct the vehicle to switch from a four-wheel drive power mode to a two-wheel drive power mode, and then a moving component of a disengaging and engaging apparatus of the vehicle is controlled to perform a position adaptive operation when unloading of torque of a first electric machine of the vehicle is completed in the elastic release operation, and then, when a rotational speed of the moving component reaches a stable state in the position adaptive operation, a meshing direction of the moving component is controlled and separation control is performed on the moving component, so that the moving component moves in a disengaging direction to a completely disengaged position of the disengaging and engaging apparatus. Through the elastic release operation, the torque of the first electric machine can be unloaded, and then through the position adaptive operation, the rotational speed of the moving component of the disengaging and engaging apparatus can reach a stable state. When the rotational speed of the moving component reaches the stable state, accurate control of the moving component in the disengaging direction can be achieved by control of the meshing direction and separation control, non-contact control or control with contact but without torque transmission can be achieved for the moving component, which can reduce or eliminate a speed difference of the moving component of the disengaging and engaging apparatus when the four-wheel drive power mode is switched to the two-wheel drive power mode, so as to avoid impact of the moving component. The disengaging and engaging apparatus can be disengaged without impact and noise, realizing imperceptible automatic shift control, and improving the driving experience of the vehicle.

DESCRIPTION OF EMBODIMENTS

Figure 1:
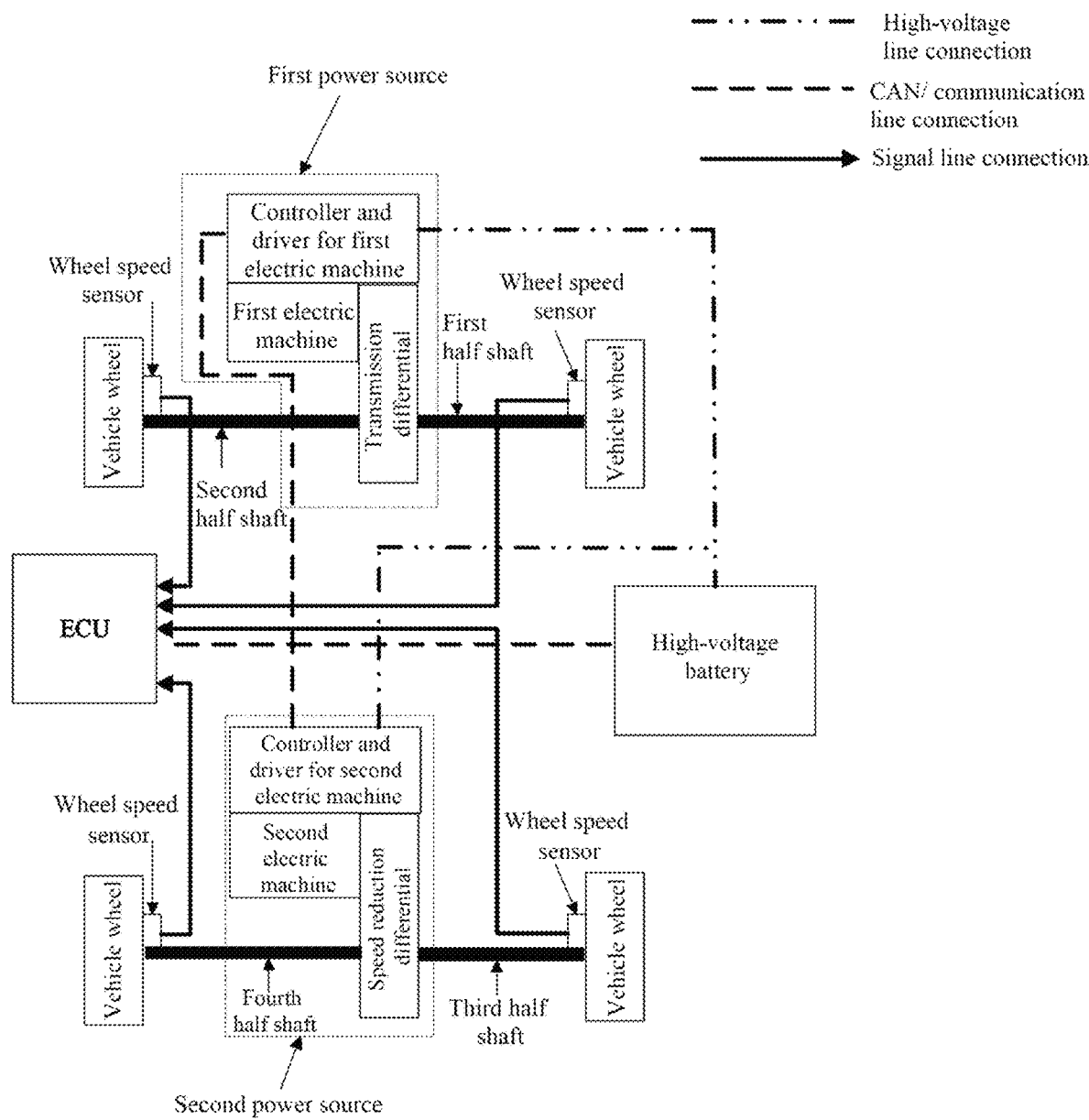
FIG. 1 is a structural diagram of a vehicle provided by an embodiment of the present application.

In order to make the purpose, technical scheme and advantages of the embodiments of the present application clearer, technical solutions in the embodiments of the present application will be clearly and completely described in combination with the accompanying drawings of the embodiments of the present application. Obviously, the described embodiments are part of the embodiments of the present application, but not all the embodiments. Based on the embodiments in the present application, all other embodiments acquired by ordinary technical personnel in the field without creative labor fall within the protection scope of the present application.

The terms "first", "second", "third", "fourth", etc. (if present) in the description and claims and the above-mentioned accompanying drawings of the present application are used to distinguish similar objects and are not necessarily used to describe a particular order or sequence. It should be understood that data thus used are interchangeable where appropriate so that embodiments of the present application described herein, for example, can be implemented in an order other than those illustrated or described herein. In addition, the terms "including" and "having", and any variations thereof, are intended to cover non-exclusive inclusions, for example, processes, methods, systems, products or devices including a series of steps or units need not be limited to those steps or units that are clearly listed. Instead, it is possible to include other steps or units that are not clearly listed or are inherent to these processes, methods, products or devices.

At present, when an automatic transmission with a function of disengaging and engaging is used to achieve power switching between two-wheel drive and four-wheel drive, the impact and noise of the transmission system are generally present when the disengaging and engaging apparatus disengages, for example, relative oscillation of rotational speed of an input shaft and an output shaft still exist when the gear is disengaged. As a result, when the disengaging and engaging apparatus is disengaged, two meshing teeth of the disengaging and engaging apparatus will clash, resulting in impact, which will seriously affect driving experience.

In view of the above problems existing in the related art, the present application provides an automatic shift control method, apparatus, device and storage medium. The inventive concept of the automatic shift control method provided by the present application lies in that: in response to a drive switching request for a vehicle from a four-wheel drive power mode to a two-wheel drive power mode, an elastic release operation is first performed to unload torque of a first electric machine, and then, a moving component of a disengaging and engaging apparatus of the vehicle is controlled to perform a position adaptive operation when unloading of the torque of the first electric machine is completed, to make a rotational speed of the moving component reaches a stable state; then, when the rotational speed of the moving component reaches a stable state, a meshing direction and separation of the moving component are controlled, so that the moving component moves in a disengaging direction to a completely disengaged position of the disengaging and engaging apparatus. Among them, the elastic release operation and position adaptive operation can reduce or eliminate a speed difference of the moving component when the four-wheel drive power mode is switched to the two-wheel drive power mode, so as to avoid impact of the moving component. When the rotational speed of the moving component reaches the stable state, the accurate control of the moving component in the disengaging direction can be achieved by control of the meshing direction and separation control, achieving non-contact control or control with contact but without torque transmission for the moving component. The disengaging and engaging apparatus can be disengaged without impact and noise, realizing imperceptible automatic shift control, and improving the driving experience of the vehicle.

Figure 2:
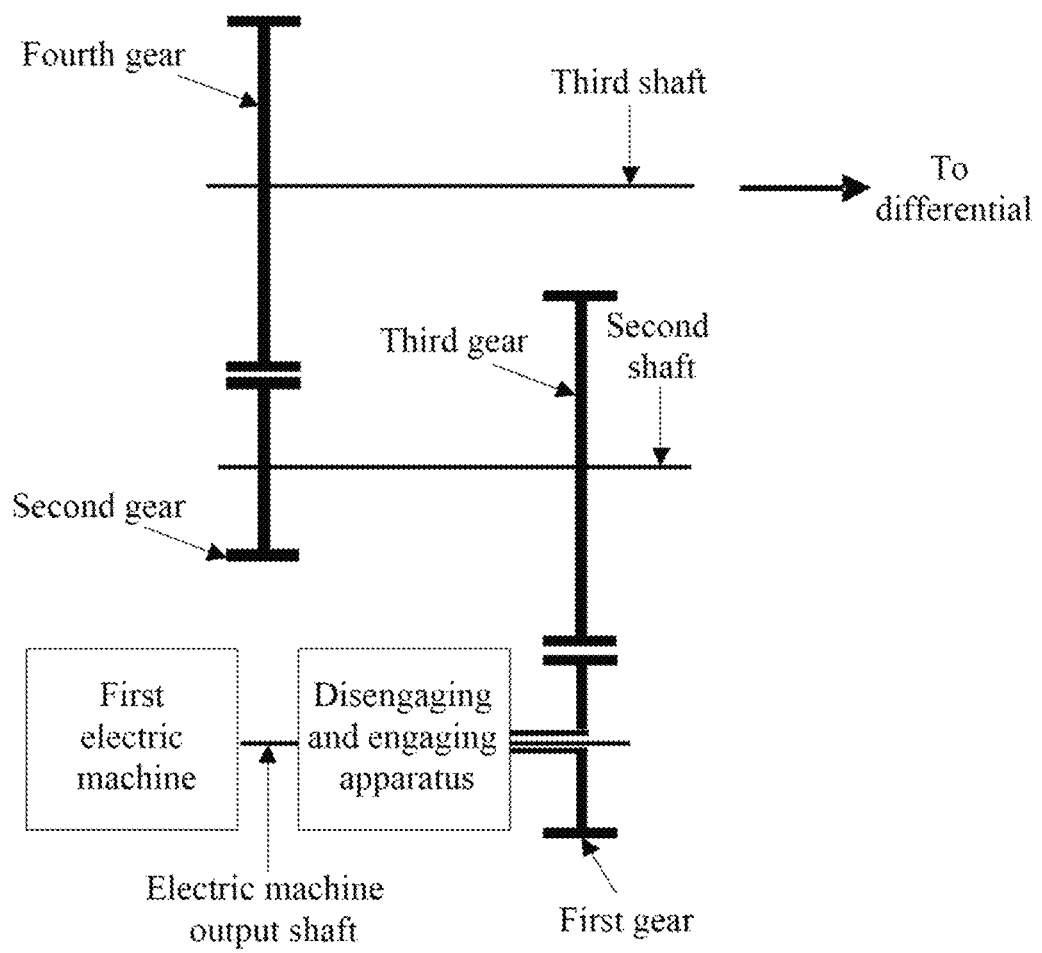
FIG. 2 is a structural diagram of a transmission differential provided by an embodiment of the present application.

FIG. 1 is a structural diagram of a vehicle provided by an embodiment of the present application, and FIG. 2 is a structural diagram of a transmission differential provided by an embodiment of the present application. As shown in FIG. 1, a first electric machine, controller and driver for the first electric machine, and a transmission differential constitute a first power source, and a second electric machine, controller and driver for the second electric machine, and a speed reduction differential constitute a second power source of the vehicle. In an implementation, the vehicle can be an electric vehicle or a hybrid vehicle, and when the vehicle is the electric vehicle, the first electric machine and the second electric machine can be generators respectively; when the vehicle is the hybrid vehicle, the first electric machine can be a generator, and the second electric machine can be an engine, and for example, an engine, a transmission, a differential, an engine controller, and a transmission controller constitute the second power source.

A controller of the vehicle is configured to be able to perform the automatic shift control method provided by the embodiments of the present application. The controller may, for example, be an Electronic Control Unit (Electronic Control Unit, ECU) shown in FIG. 1, such that when the vehicle switches from a four-wheel drive power mode to a two-wheel drive power mode, impact of the moving component of the disengaging and engaging apparatus is avoided, and accurate control of the moving component in the disengaging direction is achieved by controlling the meshing direction and separation of the moving component, so as to achieved non-contact control or control with contact but without torque transmission for the moving component, and the disengaging and engaging apparatus can be disengaged without impact and noise, realizing imperceptible automatic shift control and improving the driving experience of the vehicle.

With reference to FIG. 1 and FIG. 2, the disengaging and engaging apparatus transmits torque and interrupts transmission of torque by disconnecting or connecting a mechanical structure between the first electric machine and the differential. For example, the disengaging and engaging apparatus may be arranged on an output shaft of the electric machine, or on a second shaft, or on a third shaft, where the third shaft is connected to a differential in the transmission differential, the transmission differential also includes a transmission.

Figure 3:
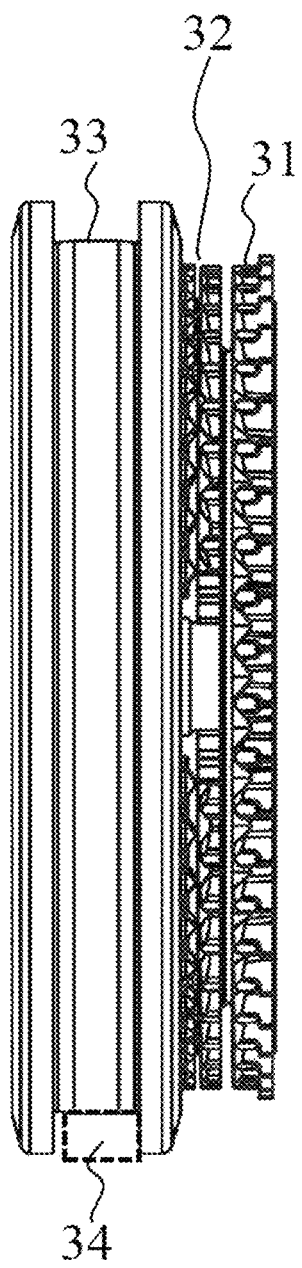
FIG. 3 is a structural diagram of a disengaging and engaging apparatus provided by an embodiment of the present application.

The disengaging and engaging apparatus shown in FIG. 2 may be illustrated as shown in FIG. 3. FIG. 3 is a structural diagram of a disengaging and engaging apparatus provided by an embodiment of the present application. As shown in FIG. 3, a shifting fork moves a gear sleeve 33 in a direction or reverse direction of engaging teeth (passive teeth) 31 through a shifting fork groove 34 to realize the engagement or disengagement of the disengaging and engaging apparatus, and a tooth hub (active teeth) 32 is located on the gear sleeve 33. When the disengaging and engaging apparatus is in engagement, the tooth hub (active teeth) 32 meshes with the engaging teeth (passive teeth) 31 to realize mechanical connection between the first electric machine and a first half shaft and a second half shaft; when the disengaging and engaging apparatus is in disengagement, the tooth hub (active teeth) 32 is disengaged from the engaging teeth (passive teeth) 31. In an implementation, a construction mode of the disengaging and engaging apparatus includes any of a synchronizer type, dog tooth type, and clutch type, and the synchronizer type is shown in FIG. 3 as an example. Among them, the engaging teeth (passive teeth) 31 and the tooth hub (active teeth) 32 shown in FIG. 3 are collectively referred to as the moving component of the disengaging and engaging apparatus.

It should be noted that FIG. 1 to FIG. 3 above are illustrative only, vehicles, transmission differentials, and disengaging and engaging apparatuses to which the automatic shift control method provided by the embodiments of the present application is applicable include, but not limited to, those as shown the in the figures mentioned above.

It should be noted that FIG. 1 to FIG. 3 above are illustrative only and do not, vehicles, transmission differentials, and disengaging and engaging apparatuses to which the automatic shift control method provided by the embodiments of the present application is applicable include, but not limited to, those as shown the in the figures mentioned above.

Figure 4:
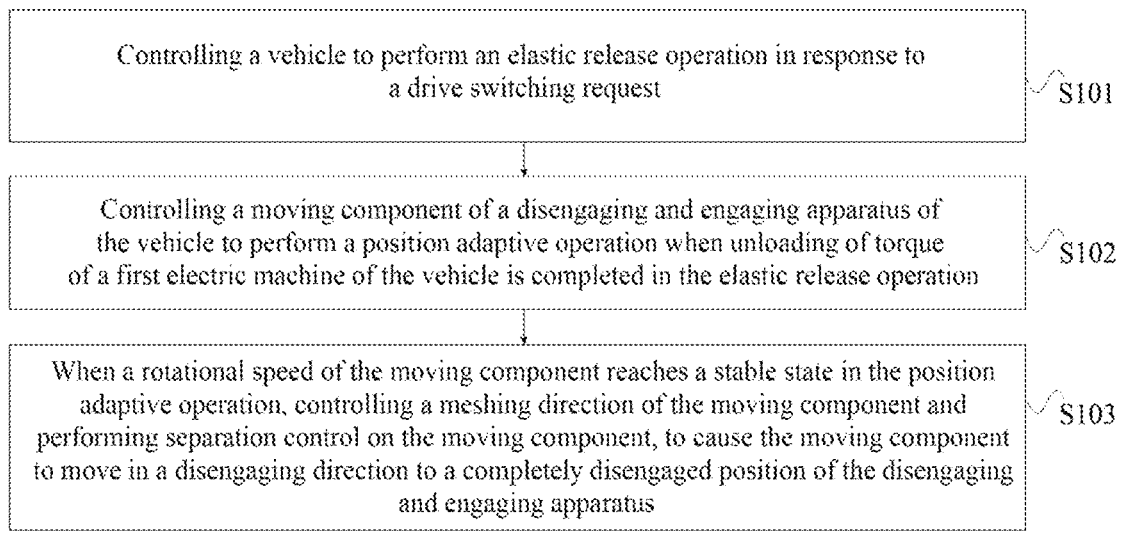
FIG. 4 is a flow diagram of an automatic shift control method provided by an embodiment of the present application.

FIG. 4 is a flow diagram of an automatic shift control method provided by an embodiment of the present application. As shown in FIG. 4, the automatic shift control method provided by the embodiment of the present application includes:

S101: controlling a vehicle to perform an elastic release operation in response to a drive switching request.

Where, the drive switching request is used to instruct the vehicle to switch from a four-wheel drive power mode to a two-wheel drive power mode.

The drive switching request is used to instruct the vehicle to switch from a four-wheel drive power mode to a two-wheel drive power mode to reduce energy consumption of the power system. Therefore, after the drive switching request is generated, the vehicle is controlled to perform the elastic release operation in response to the drive switching request. In an implementation, the elastic release operation enables unloading of torque of a first electric machine of the vehicle and elastic force in a transmission system, as well as loading of torque of a second electric machine. For example, for the transmission system composed of a first power source, a first half shaft, a second half shaft and their corresponding vehicle wheels (as shown in FIG. 1), the reduction of transmission torque of the transmission system can realize recovery of its elastic deformation, so as to realize the unloading of the elastic force.

S102: controlling a moving component of a disengaging and engaging apparatus of the vehicle to perform a position adaptive operation when unloading of torque of the first electric machine of the vehicle is completed in the elastic release operation.

When the unloading of the torque of the first electric machine of the vehicle is completed in the elastic release operation, the moving component of the disengaging and engaging apparatus of the vehicle can be controlled to enter a position adaptive operation phase to realize adaptive control of the position of the moving component, for example, to make a rotational speed of the moving component (such as passive teeth and active teeth) reach a stable state. That is, the rotational speed of the moving component reaches the stable state at the end of the position adaptive operation. Among them, a specific value of the rotational speed corresponding to the stable state may be set according to an actual working condition, which is not limited in the embodiments of the present application.

The elastic release operation can unload the elastic force of the transmission system, the transmission system is elastically released, and the elastic release can attenuate rotational speed fluctuations and relative speed difference of the moving component, (e.g. the active teeth and passive teeth). Therefore, through the elastic release operation and the position adaptive operation, the control of the attenuation of the rotational speed fluctuation and the relative speed difference of the moving component can be realized, or the rotational speed fluctuation and the relative speed difference of the moving component can be made to have characteristics of natural attenuation, effectively reducing or eliminating a speed difference of the moving component of the disengaging and engaging apparatus, such as a speed difference between the active teeth and the passive teeth, and avoiding impact of the moving component when disengaging, i.e. the impact between the active teeth and the passive teeth.

S103: when a rotational speed of the moving component reaches a stable state in the position adaptive operation, controlling a meshing direction of the moving component and performing separation control on the moving component, to cause the moving component to move in a disengaging direction to a completely disengaged position of the disengaging and engaging apparatus.

In the process of position adaptive operation, when the rotational speed of the moving component reaches the stable state, the position adaptive operation ends, and control of the meshing direction and further separation control of the moving component begin. Among them, the essence of the control of the meshing direction of the moving component is to control the meshing direction according to an expected target, so as to provide a precondition for the subsequent separation control and facilitate the accuracy of the separation control.

After completing the control of the meshing direction, separation control is further performed on the moving component, which specifically refers to controlling a position of the moving component, e.g. the relative position of the active teeth and the passive teeth. A tooth position when the disengaging and engaging apparatus is disengaged is accurately controlled, in other words, the process that the moving component moves in the disengaging direction to the completely disengaged position of the disengaging and engaging apparatus is accurately controlled. For example, the meshing direction and separation control are accurately controlled through parameters such as duration and torque within the duration, so that the non-contact control or control with contact but without torque transmission is realized for the moving component (e.g. the active teeth and passive teeth), impact of the moving component such as clash is avoided, thereby realizing disengaging control without impact and noise. When the moving component, which may specifically be the passive teeth, moves to the completely disengaged position of the disengaging and engaging apparatus, automatic shift from the four-wheel drive power mode to the two-wheel drive power mode is completed.

It is worth understanding that the elastic release operation, the position adaptive operation described in the above steps, and each step of the control of meshing direction and the separation control all occur before the gear is disengaged during the vehicle driving.

In the automatic shift control method provided by the embodiment of the present application, the torque of the first electric machine can be unloaded through the elastic release operation to achieve the unloading of the elastic force of the transmission system, and then the rotational speed of the moving component of the disengaging and engaging apparatus can reach the stable state through the position adaptive operation. This can reduce or eliminate the speed difference of the moving component of the disengaging and engaging apparatus when the four-wheel drive power mode is switched to the two-wheel drive power mode, so as to avoid impact of the moving component. When the rotational speed of the moving component reaches the stable state, the accurate control of the moving component in the disengaging direction can be achieved by control of the meshing direction and separation control, to realize non-contact control or control with contact but with no torque transmission for the moving component. The disengaging and engaging apparatus can be disengaged without impact and noise, realizing imperceptible automatic shift control and improving the driving experience of the vehicle.

Figure 5:
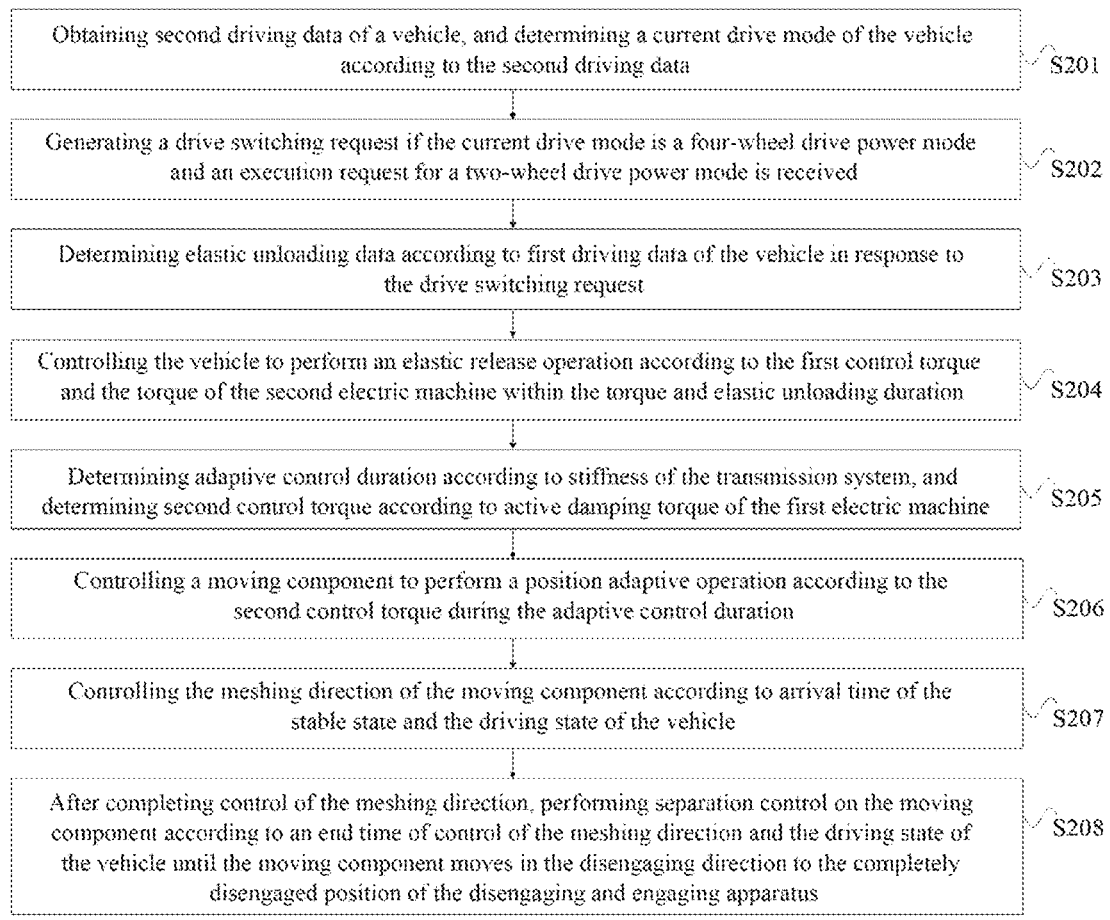
FIG. 5 is a flow diagram of another automatic shift control method provided by an embodiment of the present application.

FIG. 5 is a flow diagram of another automatic shift control method provided by an embodiment of the present application. As shown in FIG. 5, the automatic shift method provided by the embodiment of the present application includes:

S201: obtaining second driving data of a vehicle, and determining a current drive mode of the vehicle according to the second driving data.

S202: generating a drive switching request if the current drive mode is a four-wheel drive power mode and an execution request for a two-wheel drive power mode is received.

Before responding to the drive switching request, it is also necessary to judge the current drive mode of the vehicle to determine the timing of automatic shift realized by disengagement of the disengaging and engaging apparatus.

For example, first, the second driving data of the vehicle is collected, and then the current drive mode of the vehicle is determined according to the collected second driving data. When the current drive mode is determined to be the four-wheel drive power mode, and an execution request for the two-wheel drive power mode has been received, it is indicated that the timing to switch from the four-wheel drive power mode to the two-wheel drive power mode has arrived, and the drive switching request is then generated to achieve power mode switching. Among them, when it is needed to reduce the energy consumption of the power system during the vehicle driving, the execution request for the two-wheel drive power mode will be issued to instruct the vehicle to shift automatically through a disengaging operation performed by the disengaging and engaging apparatus.

In an implementation, the collected second driving data of the vehicle can include vehicle speed, ramp, accelerator pedal opening, wheel speed, rotational speed of the first electric machine, rotational speed of the second electric machine, wheel slip state, wheel lock state and other parameters to determine the current drive mode of the vehicle.

S203: determining elastic unloading data according to first driving data of the vehicle in response to the drive switching request.

Where, the elastic unloading data includes torque and elastic unloading duration, first control torque and torque of a second electric machine of the vehicle.

S204: controlling the vehicle to perform an elastic release operation according to the first control torque and the torque of the second electric machine within the torque and elastic unloading duration.

Where, in the elastic release operation, unloading of the torque of the first motor is completed when the first control torque is zero.

After the timing of automatic shift is determined, that is, after the drive switching request is generated, the vehicle is controlled to perform the elastic release operation further in response to the drive switching request.

Specifically, first, the first driving data of the vehicle is obtained in response to the drive switching request; and then the elastic unloading data is determined according to the first driving data, the elastic unloading data includes the torque and elastic unloading duration, the first control torque and the torque of the second electric machine of the vehicle; thus the elastic release operation is performed according to the elastic unloading data, until the first control torque is zero, the torque of the first electric machine is completely unloaded, and the process of elastic release operation ends.

In an implementation, the first driving data may include parameters such as vehicle speed, rotational speed of the first electric machine, rotational speed of the second electric machine, accelerator pedal opening, brake pedal opening. According to the first driving data, the torque and elastic unloading duration, the first control torque and the torque of the second electric machine are calculated. Among them, the torque and elastic unloading duration are used to control duration of the elastic release operation. The first control torque is essentially the torque that the first electric machine needs to unload during the torque and elastic unloading duration, and the torque of the second electric machine is the torque that needs to be loaded during the torque and elastic unloading duration. Therefore, when the first control torque is zero, the unloading of the torque of the first electric machine is completed in the elastic release operation. It can be understood that the first control torque and the torque needed to be loaded by the second electric machine are dynamic values, that is, they change with the torque and elastic unloading duration.

Figure 6:
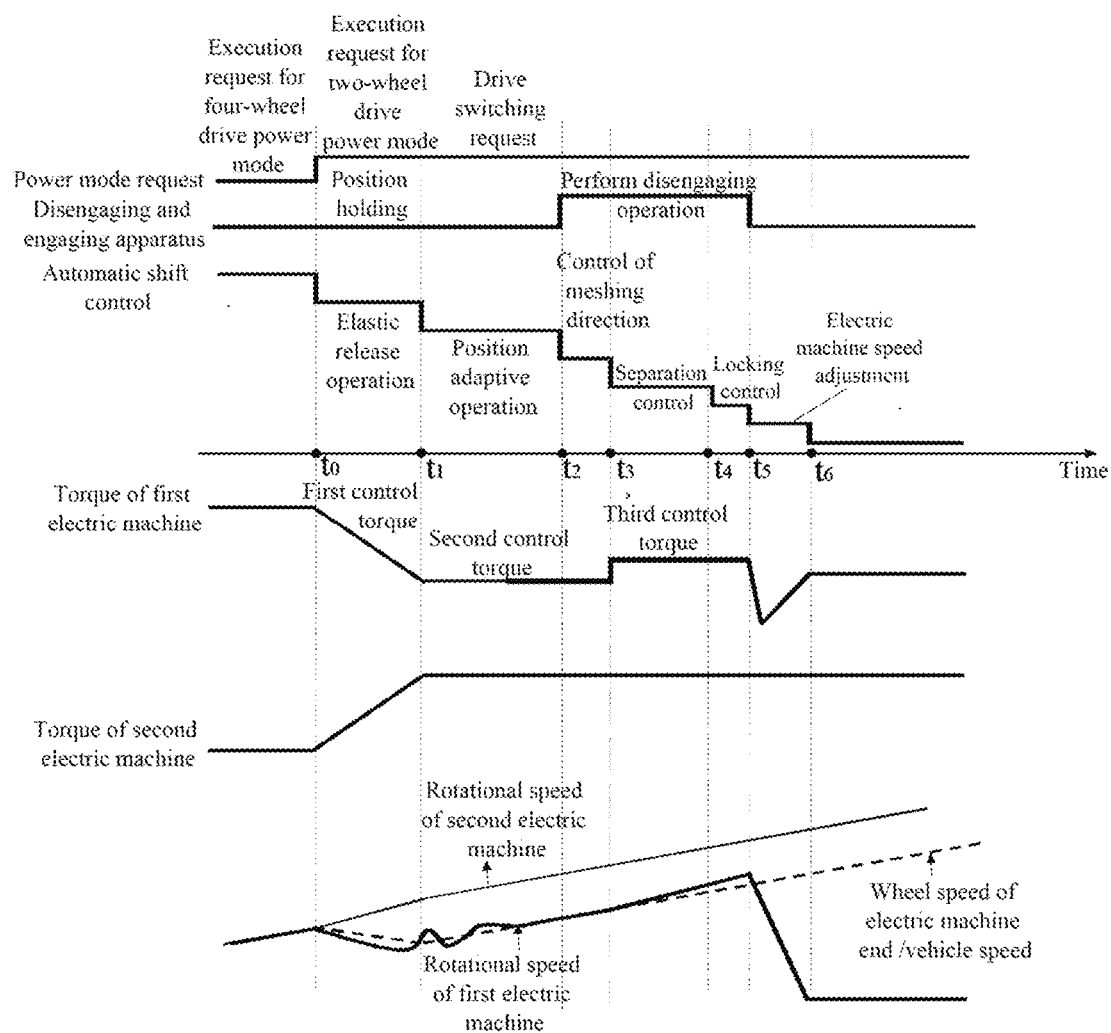
FIG. 6 is a timing diagram of automatic shift control provided by an embodiment of the present application.
Figure 7:
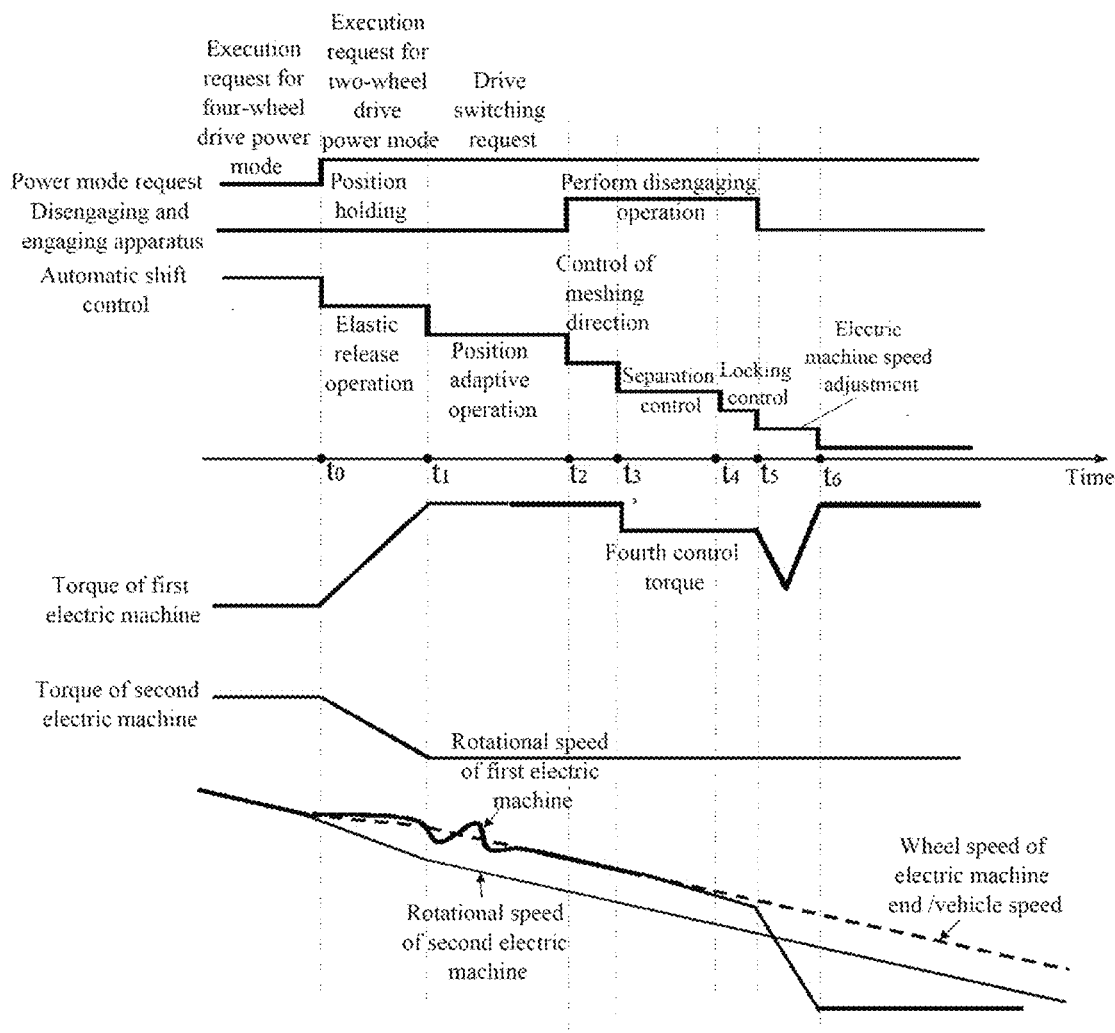
FIG. 7 is another timing diagram of automatic shift control provided by an embodiment of the present application.
Figure 8:
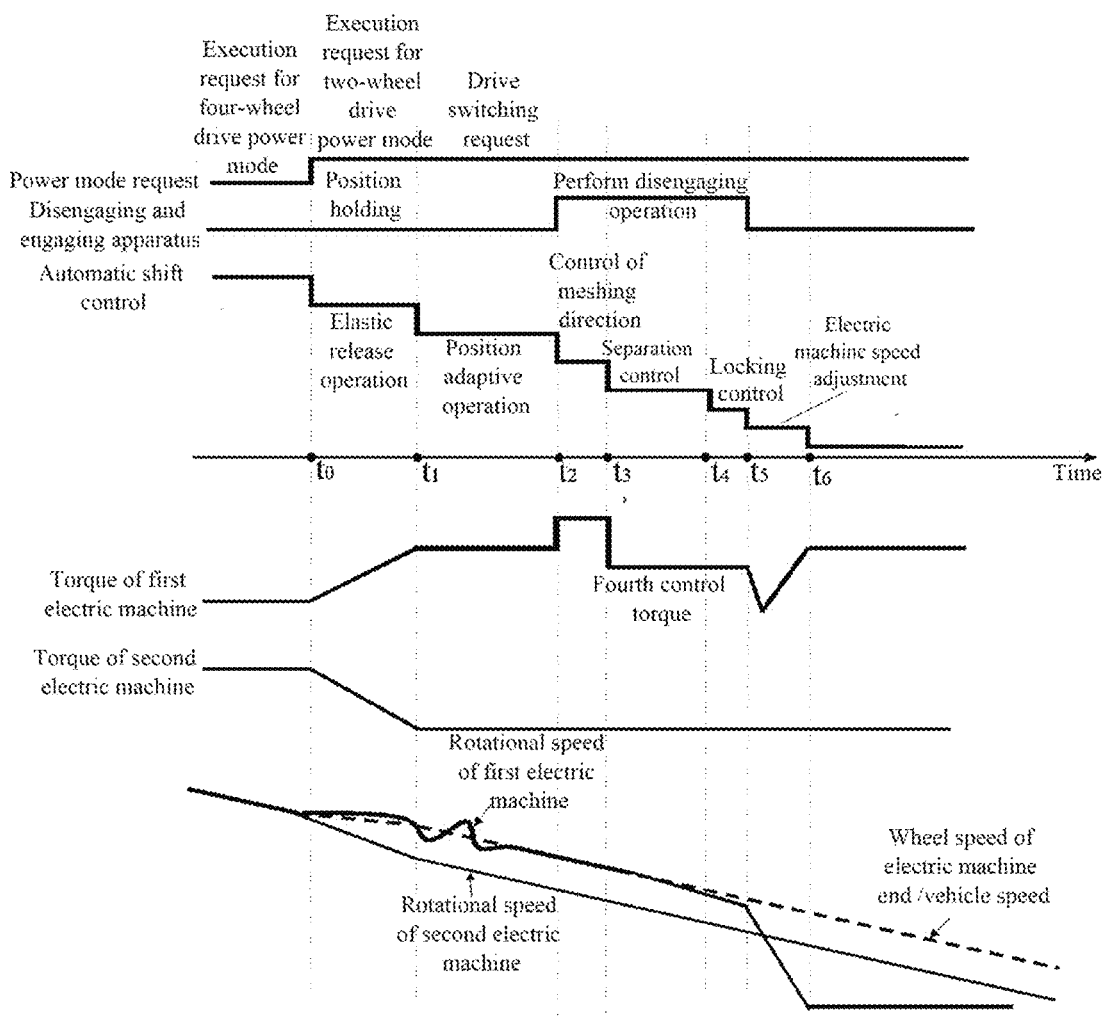
FIG. 8 is still another timing diagram of automatic shift control provided by an embodiment of the present application.

FIG. 6 to FIG. 8 are timing diagrams of automatic shift control provided by embodiments of the present application, which show processes of elastic release operation, position adaptive operation, control of meshing direction and separation control and the change of corresponding parameters of each process over time when a driving state of the vehicle is an accelerating state, a decelerating state, and a non-accelerating and non-decelerating state. For example, the corresponding parameters may be torque of the first electric machine, torque of the second electric machine, rotational speed of the first electric machine, rotational speed of the second electric machine, wheel speed of the electric machine end/vehicle speed, etc.

As shown in FIG. 6 to FIG. 8, $t_0$ represents a time of response to a drive switching request, that is, a starting time of torque and elastic unloading duration, $t_1$ represents an end time of the elastic release operation, and $t_{01}$ represents the torque and elastic unloading duration, that is, the duration of the elastic release operation. For convenience of description, $T_{F0}$ represents initial torque of the first electric machine at $t_0$, $T_{R0}$ represents initial torque of the second electric machine at $t_0$, $T_{F01}$ represents first control torque, that is, the torque of the first electric machine in a time interval of $t_0$, and $T_{R01}$ represents torque to be loaded by the second electric machine, that is, the torque of the second electric machine in the time interval of $t_{01}$.

As described above, for the transmission system composed of the first power source, the first half shaft, the second half shaft and their corresponding wheels, the reduction of transmission torque of the transmission system enables recovery of its elastic deformation, i.e. the unloading of the elastic force. Therefore, for a driver, at any time within the time interval of $t_{01}$, demand torque $T_D$ satisfies formula (1):

$$T_D = T_{F01} + T_{R01} \qquad (1)$$

A specific value of the torque and elastic unloading duration $t_{01}$ is jointly determined by the initial torque $T_{F0}$ and a change rate of the first control torque $T_{F01}$, that is, the time $t_1$ is jointly determined by the initial torque $T_{F0}$ and the first control torque $T_{F01}$. In an implementation, the change rate of the $T_{F01}$ can be less than 1000 nm/s to reduce rotational speed fluctuations caused by changes in torque.

At this point, the elastic release operation is completed through steps S203 and S204, so that the torque of the first electric machine is completely unloaded at $t_1$, and the position adaptive operation is entered.

S205: determining adaptive control duration according to stiffness of the transmission system, and determining second control torque according to active damping torque of the first electric machine.

S206: controlling a moving component to perform the position adaptive operation according to the second control torque during the adaptive control duration.

Where, in a process of the position adaptive operation, the torque of the first electric machine is the second control torque and the torque of the second electric machine is driver demand torque.

When the unloading of the torque of the first electric machine is completed, that is, when the $T_{F01}$ is 0 nm, the process of the position adaptive operation is entered. In particular, the control process of performing the position adaptive operation by controlling the adaptive control duration (represented by in $t_{12}$) and the second control torque makes the rotational speed of the moving component reach a stable state.

For example, a value of $t_{12}$ can be determined according to stiffness of the transmission system. For example, the value of $t_{12}$ can be 0.5 s<$t_{12}$<5 s. The specific value is determined by the stiffness of the transmission system in actual working conditions. The second control torque can be determined according to the active damping torque of the first electric machine, so that the rotational speed fluctuation of the moving component (e.g. active teeth and passive teeth) can be suppressed through attenuation by the resistance of the transmission system. The active damping torque of the first electric machine is jointly determined by the rotational speed fluctuation value of the electrical machine and the rotational speed. By increasing or decreasing output torque of the first electric machine, rotational speed fluctuations of a electric machine rotor and the transmission system are suppressed.

For example, the output torque of the first electric machine is represented by $T_{F12\_req}$, $T_{F12\_req}$=0 nm, that is, during the adaptive control duration, the torque of the first electric machine (represented by $T_{F12}$) $T_{F12}$=$T_{F12\_req}$=0 nm. The active damping torque of the first electric machine is represented by $T_{F12\_damping}$, which is opposite to the direction of the rotational speed fluctuation, and the size is in a directly proportional relation, that is, $T_{F12}$=$T_{F12\_req}$+$T_{F12\_damping}$, since $T_{F12\_req}$=0 nm, then $T_{F12}$=$T_{F12\_damping}$. That is, the second control torque is the torque of the first electric machine within the adaptive control duration. It can be seen from the above description that in the process of position adaptive operation, the torque of the first electric machine is the second control torque, while the torque of the second electric machine remains at the torque after loading, that is, the driver demand torque (as shown in FIG. 6 to FIG. 8). $T_{R12}$ represents the torque of the second electric machine in the time interval of $t_{12}$, that is, the torque of the second electric machine after loading in the process of the elastic release operation.

At this point, through steps S205 and S206, the position adaptive operation for the moving component of the disengaging and engaging apparatus of the vehicle is completed, so that the rotational speed of the moving component reaches the stable state.

S207: controlling the meshing direction of the moving component according to arrival time of the stable state and the driving state of the vehicle.

Where, the arrival time of the stable state is starting time of movement of the moving component from a completely engaged position to the completely disengaged position of the disengaging and engaging apparatus.

S208: after completing control of the meshing direction, performing separation control on the moving component according to an end time of control of the meshing direction and the driving state of the vehicle until the moving component moves in the disengaging direction to the completely disengaged position of the disengaging and engaging apparatus.

When the rotational speed of the moving component (e.g. the active teeth and the passive teeth) reaches the stable state, the mesh direction control phase is entered. Specifically, the meshing direction of the moving component is controlled according to the arrival time of the stable state and the driving state of the vehicle, which provides the precondition for the separation control. Among them, the arrival time of the stable state, namely $t_2$, is the starting time of movement of the moving component from the completely engaged position to the completely disengaged position of the disengaging and engaging apparatus when disengaging, so as to achieve tooth meshing in a target direction.

In a possible design, a possible implementation of this step S207 includes:

first, control duration of the meshing direction is determined according to the arrival time (represented by $t_2$) of the stable state, and third control torque is determined according to the driving state of the vehicle, and then the meshing direction of the moving component is controlled according to the third control torque during the control duration of the meshing direction.

For example, since the control duration of the meshing direction is a time interval between an arrival time of the stable state and an end time of the control of the meshing direction, assuming that $t_3$ represents the end time of the control of the meshing direction, in actual working conditions, $t_3$ can be any time from $t_2$ to before the moving component (e.g. the active teeth and the passive teeth) is disengaged, that is, it can be determined manually. When $t_3$ is determined, the control duration of the meshing direction is determined, that is, the control duration of the meshing direction (represented by $t_{23}$) can be determined according to the arrival time of the stable state. At the time $t_3$, the disengaging and engaging apparatus should be in a locking position where it is just out of engagement, that is, the moving component (e.g. the active teeth and the passive teeth) begins to separate longitudinally, and the active teeth and passive teeth remain meshing at this time.

Further, the third control torque, i.e. the torque of the first electric machine in the time interval of $t_{23}$, is determined according to the driving state of the vehicle, where the driving state includes an accelerating state, a decelerating state, and a non-accelerating and non-decelerating state.

For example, when the driving state of the vehicle is the accelerating state, that is, the rotational speed acceleration of the first electric machine at the time $t_2$ (represented by $a_{F2}$) is greater than a first acceleration threshold (represented by $a_{TH1}$), or the torque of the second electric machine (that is, the torque after loading, represented by $T_{R23}$) is greater than a first torque threshold (represented by $T_{TH1}$), as shown in FIG. 6, the third control torque (represented by $T_{F23}$) is the torque $T_{F12}$ of the first electric machine in the time interval of $t_{12}$.

When the driving state of the vehicle is the decelerating state, that is, the rotational speed acceleration of the first electric machine at the time $t_2$ (represented by $a_{F2}$) is less than a second acceleration threshold (represented by $a_{TH2}$), or the torque of the second electric machine (represented by $T_{R23}$) is less than a second torque threshold (represented by $T_{TH2}$), as shown in FIG. 7, the third control torque (represented by $T_{F23}$) is the torque $T_{F12}$ of the first electric machine in the time interval of $t_{12}$.

When the driving state of the vehicle is neither the accelerating state nor the decelerating state, the torque $T_{R23}$ of the second electric machine and the rotational speed acceleration $a_{F2}$ of the first electric machine do not meet the above two conditions, and the third control torque $T_{F23}$ depends on the acceleration $a_{F2}$ of the first electric machine at the time $t_2$. For example, when $a_{F2} \geq 0$, $T_{F23}$ is a product of $a_{TH1}$ and I; when $a_{F2} < 0$, $T_{F23}$ is a product of $a_{TH2}$ and I, where I represents the total moment of inertia of the rotor and co-rotating parts of the first electric machine, as shown in FIG. 8.

With reference to FIG. 6 to FIG. 8, in a process of controlling the meshing direction, the torque of the first electric machine is the third control torque and the torque of the second electric machine is the driver demand torque.

In an implementation, the third control torque can be determined to be 0 nm regardless of the driving state of the vehicle.

After completing the control of the meshing direction, separation control is further performed. Specifically, according to the end time of the control of the meshing direction and the driving state of the vehicle, separation control is performed on the moving component until the moving component moves in the disengaging direction to the completely disengaged position of the disengaging and engaging apparatus, so as to complete the disengaging operation.

In a possible design, a possible implementation of step S208, includes:

firstly, separation control duration is determined according to the end time $t_3$ of the control of the meshing direction and the completely disengaged position, and the fourth control torque is determined according to the driving state of the vehicle, and then separation control is performed on the moving component according to the fourth control torque during the separation control duration.

The time taken by the disengaging and engaging apparatus to move from the completely engaged position to the completely disengaged position is represented by $t_{24}$, the value of which is determined by the maximum and minimum drive speeds of the drive apparatus of the disengaging and engaging apparatus. Since the end time $t_3$ of the control of the meshing direction has been determined, and $t_{24}=t_{23}+t_{34}$, the separation control duration (represented by $t_{34}$) is determined by $t_3$ and the completely disengaged position. In an implementation, $0.1\text{ s} < t_{24<1}\text{ s}$.

Further, according to the driving state of the vehicle, the fourth control torque is determined, that is, the torque of the first electric machine in the time interval of $t_{34}$, and is represented by $T_{F34}$.

For example, when the driving state of the vehicle is the accelerating state, that is, the rotational speed acceleration of the first electric machine at the time $t_2$ (represented by $a_{F2}$) is greater than the first acceleration threshold (represented by $a_{TH1}$), or the torque of the second electric machine (that is, the torque after loading, represented by $T_{R23}$) is greater than the first torque threshold (represented by $T_{TH1}$), the fourth control torque can be obtained by formula (2):

$$T_{F34} = a_{F34\_rotor} * I = a_{F34\_whl} * I + T_{Separate} \tag{2}$$

where $T_{Separate}$ can be represented by a torque component of $T_{F34}$, which can be obtained by the following formula (3):

$$T_{Separate} = (a_{F34\_rotor} - a_{F34\_whl}) * I \tag{3}$$

where $a_{F34\_rotor}$ can be represented as, for example, the rotational speed acceleration of the active tooth in the time interval of $t_{34}$, and $a_{F34\_whl}$ can be represented as, for example, the rotational speed acceleration of the passive tooth in the time interval of $t_{34}$, $a_{F34\_whl}$ is calculated by the wheel speed or vehicle speed, and because the time of $t_{34}$ is very short, $a_{F34\_whl}$ and $a_{F34\_rotor}$ can be approximately considered unchanged, that is, they are constant values.

In an implementation, when the moving component (e.g. the active teeth and the passive teeth) in the disengaging and engaging apparatus is separated, the active tooth is in a middle position of a tooth space of the passive teeth, and the following formulas (4) to (7) are obtained:

$$L/K/2 < (t_{34})^2/2 * (a_{F34\_rotor} - a_{F34\_whl}) < L*K/2 \quad (4)$$

that is, $L/K/(t_{34})^2 < (a_{F34\_rotor} - a_{F34\_whl}) < L*K/(t_{34})^2 \quad (5)$ that is, $L*I/K/(t_{34})^2 < T_{Separate} < L*K*I/(t_{34})^{2'} \quad (6)$ that is, $L*I/K/(t_{34})^2 + a_{F34\_whl} * \quad (7)$ $$I < T_{F34} < L*K*I/(t_{34})^2 + a_{F34\_whl}*I$$

In an implementation, the fourth control torque can also satisfy the following formula (8):

$$T_{F34} = L*I/(t_{34})^2 + a_{F34\_whl}*I \quad (8)$$

where L can represent a standard tooth space of the moving component (e.g. the active teeth and passive teeth) in the disengaging and engaging apparatus, and K can represent a statistical coefficient of the tooth space of the moving component (e.g. the active teeth and passive teeth) in the disengaging and engaging apparatus. For example, in a certain number of qualified disengaging and engaging apparatus, the tooth space of the moving component should be between L/K and L*K. In addition, since the time of $t_{23}$ is very short, it can be approximated that $a_{F23}$ is unchanged. In the accelerating state, the fourth control torque and the torque of the second electric machine in the separation control process can be as shown in FIG. 6.

When the driving state of the vehicle is the decelerating state, that is, the rotational speed acceleration of the first electric machine at the time $t_2$ (represented by $a_{F2}$) is less than the second acceleration threshold (represented by $a_{TH2}$), or the torque of the second electric machine (represented by $T_{R23}$) is less than the second torque threshold (represented by $T_{TH2}$), as shown in FIG. 7, the determination of the fourth control torque is the same as that of the accelerating state. In an implementation, the fourth control torque can also be obtained by the following formula (9):

$$T_{F34} = -L*I/(t_{34})^2 + a_{F34\_whl}*I \quad (9)$$

When the driving state of the vehicle is neither the accelerating state nor the decelerating state, the torque $T_{R23}$ of the second electric machine and the rotational speed acceleration $a_{F2}$ of the first electric machine do not meet the above two conditions, and the fourth control torque $T_{F34}$ depends on the acceleration $a_{F2}$ of the first electric machine at the time $t_2$. For example, when $a_{F2} \geq 0$ and $a_{F2} < 0$, the fourth control torque is obtained by the following formulas (10) and (11), respectively:

when $a_{F2} \geq 0$, $T_{F34} = L*I/(t_{34})^2 + a_{F34\_whl}*I \quad (10)$ when $a_{F2} < 0$, $T_{F34} = -L*I/(t_{34})^2 + a_{F34\_whl}*I \quad (11)$ When a state is neither accelerating nor decelerating, the fourth control torque and the torque of the second electric machine in the separation control process can be as shown in FIG. 8.

In an implementation, the fourth control torque can be determined to be 0 nm regardless of the driving state of the vehicle.

As shown in FIG. 6 to FIG. 8, during the separation control process of the moving component, the torque of the first electric machine is the fourth control torque, and the torque of the second electric machine is always equal to the driver demand torque.

Figure 9:
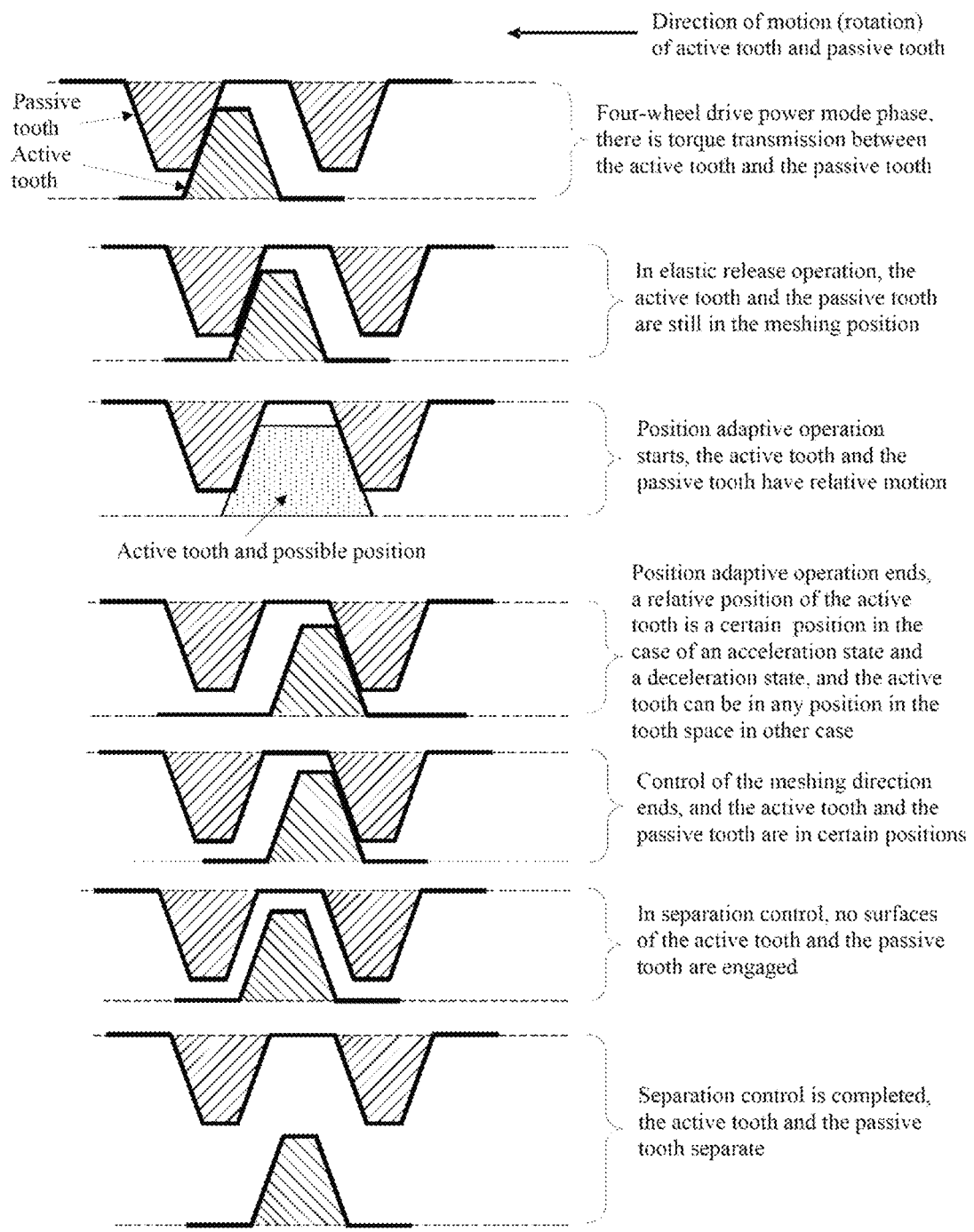
FIG. 9 is a schematic diagram of a relative position of an active tooth and a passive tooth provided by an embodiment of the present application.

At this point, through steps S207 and S208, the control of the meshing direction and separation control of the moving component of the disengaging and engaging apparatus of the vehicle are completed, so that the moving component moves in the disengaging direction to the completely disengaged position of the disengaging and engaging apparatus, and the disengaging operation is completed, thereby realizing automatic shift. FIG. 9 schematically shows position changes of active and passive teeth in the process of elastic release operation, position adaptive operation, control of the meshing direction and separation control. With reference to the embodiments described in FIG. 9 and above, it can be seen that the elastic release operation can unload the elastic force of the transmission system, and the position adaptive operation makes the rotational speed of the active tooth and the passive tooth reach a stable state, thereby reducing or eliminating the speed difference between the meshing gears of the disengaging and engaging apparatus, and avoiding the impact between the meshing gears of the disengaging and engaging apparatus. The subsequent control of the meshing direction and separation control can achieve accurate control of the tooth position, so that the active tooth and the passive tooth can be controlled to have no contact or have contact but have no torque transmission, avoiding the tooth clash problem between the two, and achieving no impact and no noise disengaging operation.

The automatic shift control method provided in the embodiment of the present application effectively reduces or eliminates the speed difference of the moving component of the disengaging and engaging apparatus when the four-wheel drive power mode is switched to the two-wheel drive power mode through the elastic release operation and the position adaptive operation, so as to avoid impact of the moving component. When the rotational speed of the moving component reaches the stable state, the moving component can be accurately controlled in the disengaging direction by control of the meshing direction and separation control, and non-contact control or control with contact but without torque transmission can be achieved for the moving component. The disengaging and engaging apparatus can be disengaged without impact and noise, imperceptible automatic shift control is realized, and the driving experience of the vehicle is improved.

In a possible design, when the moving component moves in the disengaging direction to the completely disengaged position of the disengaging and engaging apparatus, the following steps are also included:

At the time $t_4$, the moving component (e.g. the active teeth and the passive teeth) have been completely disengaged, and the moving component, specifically the active teeth, can be further controlled to continue to move in the disengaging direction, to complete the control from the completely disengaged position to the disengaged locking position of the teeth, so as to complete the locking control.

For example, after the time $t_4$, there is no contact between the active teeth and the passive teeth, and the torque $T_{F45}$ of the first electric machine cannot be transmitted to the transmission system, so $T_{F45}$ can be any torque value allowed by the working condition, but for the consideration of rationality of control, simplicity and minimum energy consumption, it can make $T_{F45}=T_{F34}$ or $T_{F45}=0$ nm.

In a possible design, after the moving component is controlled to move from the completely disengaged position to the disengaged locking position, the following steps may also be included:

by controlling feed operation of the first electric machine, the kinetic energy of the rotor of the first electric machine is converted into electrical energy to be stored in a battery (such as a high-voltage battery in FIG. 1) or to supply power to other high-voltage components on the vehicle, to complete speed adjustment of the electric machine.

For example, the rotor speed of the first electric machine is gradually controlled to 0 speed by controlling the torque of the first electric machine (represented by $T_{F56}$) within the electric machine speed adjustment duration (represented by $t_{56}$), in order to convert the kinetic energy of the rotor of the first electric machine into electrical energy to store it in the battery (such as the high-voltage battery in FIG. 1) or to supply power to other high-voltage components on the vehicle. The values of $t_{56}$ and $T_{F56}$ are determined jointly by the maximum allowable feedback power of the high-voltage system and the rotor speed of the first electric machine at the time t5.

The torque of the first electric machine and the torque of the second electric machine, the rotational speed of the first electric machine and the second electric machine and the wheel speed of the electric machine end/vehicle speed in the time intervals of $t_{45}$ and $t_{56}$ are as shown in FIG. 6 to FIG. 8.

Figure 10:
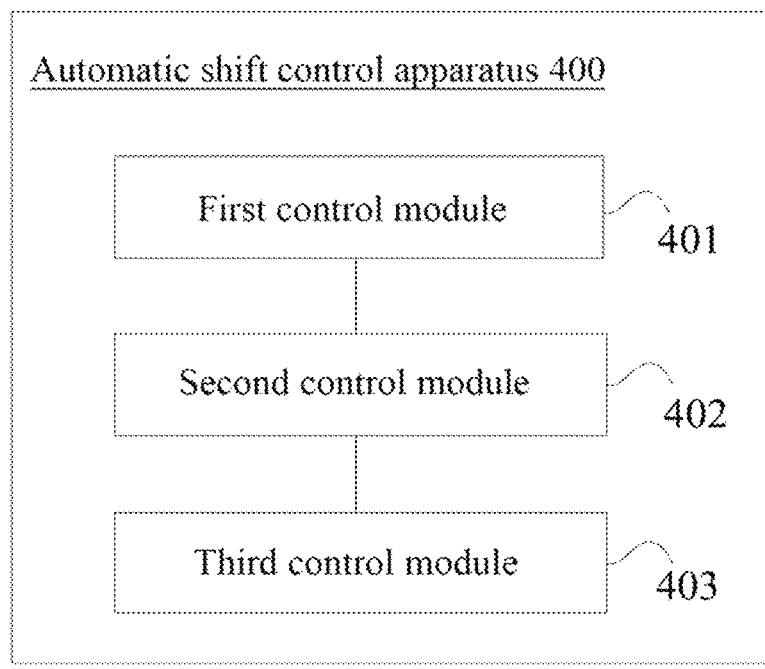
FIG. 10 is structural diagram of an automatic shift control apparatus provided by an embodiment of the present application.

FIG. 10 is structural diagram of an automatic shift control apparatus provided by an embodiment of the present application. As shown in FIG. 10, the automatic shift control apparatus 400 provided in the embodiment includes:

a first control module 401, configured to control a vehicle to perform an elastic release operation in response to a drive switching request, where the drive switching request is used to instruct the vehicle to switch from a four-wheel drive power mode to a two-wheel drive power mode;

a second control module 402, configured to control a moving component of a disengaging and engaging apparatus of the vehicle to perform a position adaptive operation when unloading of torque of a first electric machine of the vehicle is completed in the elastic release operation;

a third control module 403, configured to, when a rotational speed of the moving component reaches a stable state in the position adaptive operation, control a meshing direction of the moving component and performing separation control on the moving component, to cause the moving component to move in a disengaging direction to a completely disengaged position of the disengaging and engaging apparatus.

It is worth noting that the automatic shift control apparatus provided by the above embodiments can perform steps of the automatic shift control method provided by any of the above embodiments, and the specific implementation and technical effect are similar, which will not be described here.

Figure 11:
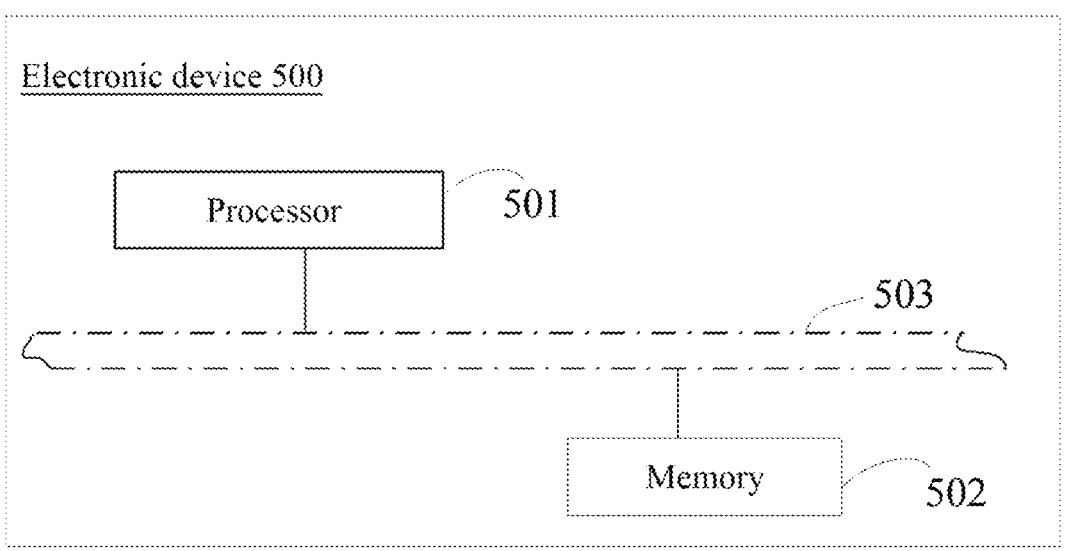
FIG. 11 is a structural diagram of an electronic device provided by an embodiment of the present application.

FIG. 11 is a structural diagram of an electronic device provided by an embodiment of the present application. As shown in FIG. 11, an electronic device 500 may includes: a processor 501, and a memory 502 communicatively connected with the processor 501.

The memory 502 is configured to store a program. Specifically, the program may include program codes, and the program codes include computer-executed instructions.

The memory 502 may contain a high-speed RAM memory, or it may also include a non-volatile memory (NoN-volatile memory), such as at least one disk memory.

The processor 501 is configured to execute computer-executed instructions stored in the memory 502 to implement the automatic shift control method.

The processor 501 may be a central processing unit (Central Processing Unit, CPU), or an application specific integrated circuit (Application Specific Integrated Circuit, ASIC), or one or more integrated circuits configured to implement the embodiment of the present application.

In an implementation, the memory 502 can be either standalone or integrated with the processor 501. When the memory 502 is a separate device from the processor 501, the electronic device 500 may also include:

a bus 503, configured to connect the processor 501 and the memory 502. The bus may be an industry standard architecture (industry standard architecture, ISA) bus, a peripheral component interconnect (peripheral component interconnect, PCI) bus or an extended industry standard architecture (extended industry standard architecture, EISA) bus. The bus may be divided into an address bus, a data bus, a control bus, etc., but it does not mean that there is only one bus or one type of bus.

In an implementation, in terms of specific implementation, if the memory 502 and the processor 501 are integrated on a single chip, the memory 502 and the processor 501 may communicate through an internal interface.

The present application also provides a computer readable storage medium which may include: a U disk, a portable hard disk, a read-only memory (ROM, Read Only Memory), a random access memory (RAM, Random Access Memory), a magnetic disk or a compact disk and other media that can store program codes. Specifically, the computer readable storage medium stores computer-executed instructions, and the computer-executed instructions are used for steps of the method in the above embodiment.

The present application also provides a computer program product including the computer-executed instructions, and the steps of the method in the above embodiment are implemented when the computer-executed instructions are executed by the processor.

Persons skilled in the art, after considering the specification and practicing the invention disclosed herein, will readily think of other implementations of the present application. The present application is intended to cover any variation, use or adaptation of the present application that follows the general principles of the present application and includes common knowledge or conventional technical means in the field of technology not disclosed in the present application. The specifications and embodiments are deemed to be illustrative only, and the true scope and spirit of the present application are indicated by the claims.

It should be understood that the present application is not limited to the accurate structure already described above and shown in the accompanying drawings, and that various modifications and changes may be made without deviating from its scope. The scope of the present application is limited only by the attached claims.

What is claimed is:

1. An automatic shift control method, comprising:
controlling a vehicle to perform an elastic release operation in response to a drive switching request, wherein the drive switching request is used to instruct the vehicle to switch from a four-wheel drive power mode to a two-wheel drive power mode;
controlling a moving component of a disengaging and engaging apparatus of the vehicle to perform a position adaptive operation when unloading torque of a first electric machine of the vehicle is completed in the elastic release operation;
when a rotational speed of the moving component reaches a stable state in the position adaptive operation, controlling a meshing direction of the moving component and performing separation control on the moving component, to cause the moving component to move in a disengaging direction to a completely disengaged position of the disengaging and engaging apparatus.

2. The automatic shift control method according to claim 1, after the moving component moves in the disengaging direction to the completely disengaged position of the disengaging and engaging apparatus, further comprising:
controlling the moving component to move from the completely disengaged position to a disengaged locking position in the disengaging direction.

3. The automatic shift control method according to claim 2, after controlling the moving component to move from the completely disengaged position to the disengaged locking position, further comprising:
controlling a rotor speed of the first electric machine of the vehicle to zero rotational speed to convert kinetic energy of the first electric machine into electric energy for storage or power supply.

4. The automatic shift control method according to claim 3, wherein the controlling the vehicle to perform the elastic release operation in response to the drive switching request comprises:
determining elastic unloading data according to first driving data of the vehicle in response to the drive switching request, wherein the elastic unloading data comprises torque and elastic unloading duration, first control torque and torque of a second electric machine of the vehicle;
controlling the vehicle to perform the elastic release operation according to the first control torque and the torque of the second electric machine within the torque and elastic unloading duration;
wherein, in the elastic release operation, the unloading of the torque of the first electric machine is completed when the first control torque is zero.

5. The automatic shift control method according to claim 3, before the controlling the vehicle to perform the elastic release operation in response to the drive switching request, further comprising:
obtaining second driving data of the vehicle; and determining a current drive mode of the vehicle according to the second driving data;
generating the drive switching request if the current drive mode is the four-wheel drive power mode and an execution request for the two-wheel drive power mode is received.

6. The automatic shift control method according to claim 2, wherein the controlling the vehicle to perform the elastic release operation in response to the drive switching request comprises:
determining elastic unloading data according to first driving data of the vehicle in response to the drive switching request, wherein the elastic unloading data comprises torque and elastic unloading duration, first control torque and torque of a second electric machine of the vehicle;
controlling the vehicle to perform the elastic release operation according to the first control torque and the torque of the second electric machine within the torque and elastic unloading duration;
wherein, in the elastic release operation, the unloading of the torque of the first electric machine is completed when the first control torque is zero.

7. The automatic shift control method according to claim 2, before the controlling the vehicle to perform the elastic release operation in response to the drive switching request, further comprising:
obtaining second driving data of the vehicle; and determining a current drive mode of the vehicle according to the second driving data;
generating the drive switching request if the current drive mode is the four-wheel drive power mode and an execution request for the two-wheel drive power mode is received.

8. The automatic shift control method according to claim 1, wherein the controlling the vehicle to perform the elastic release operation in response to the drive switching request comprises:
determining elastic unloading data according to first driving data of the vehicle in response to the drive switching request, wherein the elastic unloading data comprises torque and elastic unloading duration, first control torque and torque of a second electric machine of the vehicle;
controlling the vehicle to perform the elastic release operation according to the first control torque and the torque of the second electric machine within the torque and elastic unloading duration;
wherein, in the elastic release operation, the unloading of the torque of the first electric machine is completed when the first control torque is zero.

9. The automatic shift control method according to claim 8, wherein the controlling the moving component of the disengaging and engaging apparatus of the vehicle to perform the position adaptive operation comprises:
determining adaptive control duration according to stiffness of a transmission system, and determining second control torque according to active damping torque of the first electric machine;
controlling the moving component to perform the position adaptive operation according to the second control torque during the adaptive control duration;
wherein, in a process of the position adaptive operation, the torque of the first electric machine is the second control torque and the torque of the second electric machine is driver demand torque; at the end of the position adaptive operation, the rotational speed of the moving component reaches the stable state.

10. The automatic shift control method according to claim 9, wherein the controlling the meshing direction of the moving component and performing separation control on the moving component comprises:

controlling the meshing direction of the moving component according to an arrival time of the stable state and a driving state of the vehicle, wherein the arrival time of the stable state is a starting time of movement of the moving component from a completely engaged position to the completely disengaged position of the disengaging and engaging apparatus;

after completing control of the meshing direction, performing separation control on the moving component according to an end time of control of the meshing direction and the driving state of the vehicle until the moving component moves in the disengaging direction to the completely disengaged position of the disengaging and engaging apparatus;

wherein the driving state comprises an accelerating state, a decelerating state, and a non-accelerating and non-decelerating state.

11. The automatic shift control method according to claim 10, wherein the controlling the meshing direction of the moving component according to the arrival time of the stable state and the driving state of the vehicle comprises:

determining control duration of the meshing direction according to the arrival time of the stable state, and determining third control torque according to the driving state of the vehicle;

controlling the meshing direction of the moving component according to the third control torque during the control duration of the meshing direction;

wherein, in a process of controlling the meshing direction, the torque of the first electric machine is the third control torque and the torque of the second electric machine is the driver demand torque.

12. The automatic shift control method according to claim 10, wherein the performing separation control on the moving component according to the end time of the control of the meshing direction and the driving state of the vehicle, comprises:

determining separation control duration according to the end time of the control of the meshing direction and the completely disengaged position;

determining fourth control torque according to the driving state of the vehicle;

performing separation control on the moving component according to the fourth control torque during the separation control duration;

wherein, in a process of performing the separation control on the moving component, the torque of the first electric machine is the fourth control torque and the torque of the second electric machine is the driver demand torque.

13. The automatic shift control method according to claim 10, before the controlling the vehicle to perform the elastic release operation in response to the drive switching request, further comprising:

obtaining second driving data of the vehicle; and determining a current drive mode of the vehicle according to the second driving data;

generating the drive switching request if the current drive mode is the four-wheel drive power mode and an execution request for the two-wheel drive power mode is received.

14. The automatic shift control method according to claim 9, before the controlling the vehicle to perform the elastic release operation in response to the drive switching request, further comprising:

obtaining second driving data of the vehicle; and determining a current drive mode of the vehicle according to the second driving data;

generating the drive switching request if the current drive mode is the four-wheel drive power mode and an execution request for the two-wheel drive power mode is received.

15. The automatic shift control method according to claim 8, before the controlling the vehicle to perform the elastic release operation in response to the drive switching request, further comprising:

obtaining second driving data of the vehicle; and determining a current drive mode of the vehicle according to the second driving data;

generating the drive switching request if the current drive mode is the four-wheel drive power mode and an execution request for the two-wheel drive power mode is received.

16. The automatic shift control method according to claim 1, before the controlling the vehicle to perform the elastic release operation in response to the drive switching request, further comprising:

obtaining second driving data of the vehicle; and determining a current drive mode of the vehicle according to the second driving data;

generating the drive switching request if the current drive mode is the four-wheel drive power mode and an execution request for the two-wheel drive power mode is received.

17. The automatic shift control method according to claim 1, wherein the vehicle comprises an electric vehicle or a hybrid vehicle;

when the vehicle is the electric vehicle, the first electric machine and a second electric machine respectively comprise a generator;

when the vehicle is the hybrid vehicle, the first electric machine comprises a generator and a second electric machine comprises an engine.

18. The automatic shift control method according to claim 1, wherein a construction mode of the disengaging and engaging apparatus comprises any of a synchronizer type, a dog tooth type, and a clutch type;

when the construction mode is the synchronizer type or the dog tooth type, the moving component comprises passive teeth and active teeth.

19. A non-transitory computer readable storage medium, wherein the non-transitory computer readable storage medium stores computer-executed instructions, and the computer-executed instructions, when executed by a processor, are used to implement the automatic shift control method according to claim 1.

20. An automatic shift control apparatus, comprising:
at least one processor and memory; and
the memory storing computer-executed instructions;
the at least one processor executing the computer-executed instructions stored in the memory to enable the at least one processor to:
control a vehicle to perform an elastic release operation in response to a drive switching request, wherein the drive switching request is used to instruct the vehicle to switch from a four-wheel drive power mode to a two-wheel drive power mode;
control a moving component of a disengaging and engaging apparatus of the vehicle to perform a position adaptive operation when unloading torque of a first electric machine of the vehicle is completed in the elastic release operation; and when a rotational speed of the moving component reaches a stable state in the position adaptive operation, control a meshing direction of the moving component and perform separation control on the moving component, to cause the moving component to move in a disengaging direction to a completely disengaged position of the disengaging and engaging apparatus.

\* \* \* \* \*